Feb. 5, 1946.  S. READ, JR  2,394,480
INTERLOCKED MOTOR SYSTEM
Filed Sept. 30, 1941  2 Sheets-Sheet 2
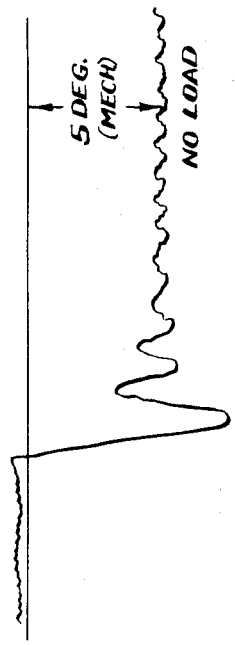
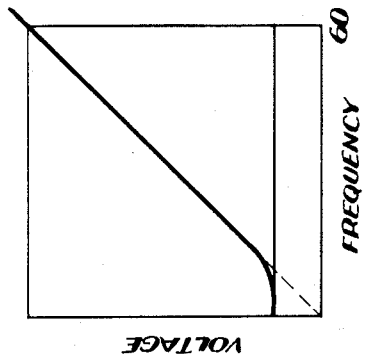
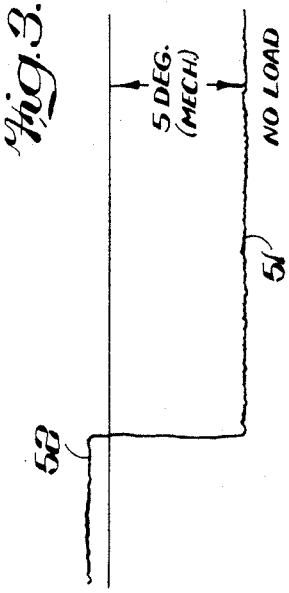
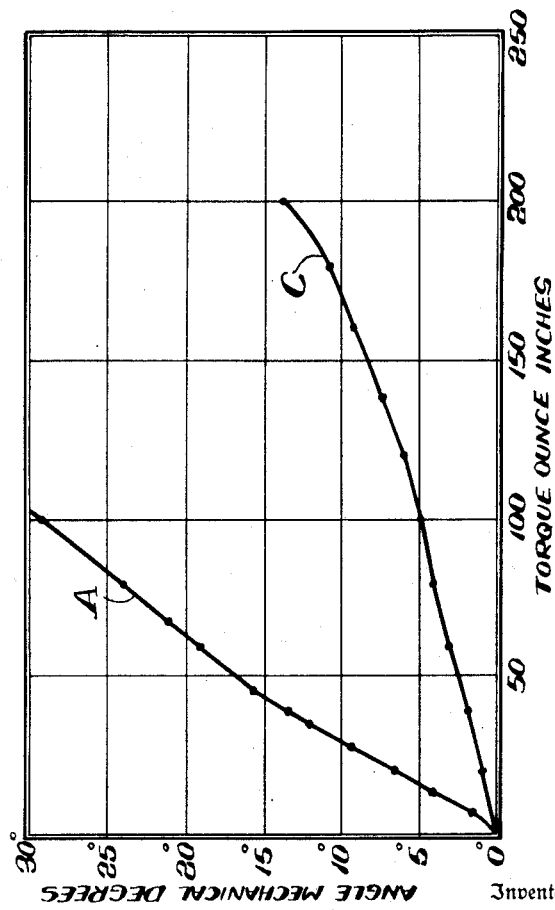
Inventor
SIDNEY READ, JR.
By J. Huff
Attorney Patented Feb. 5, 1946

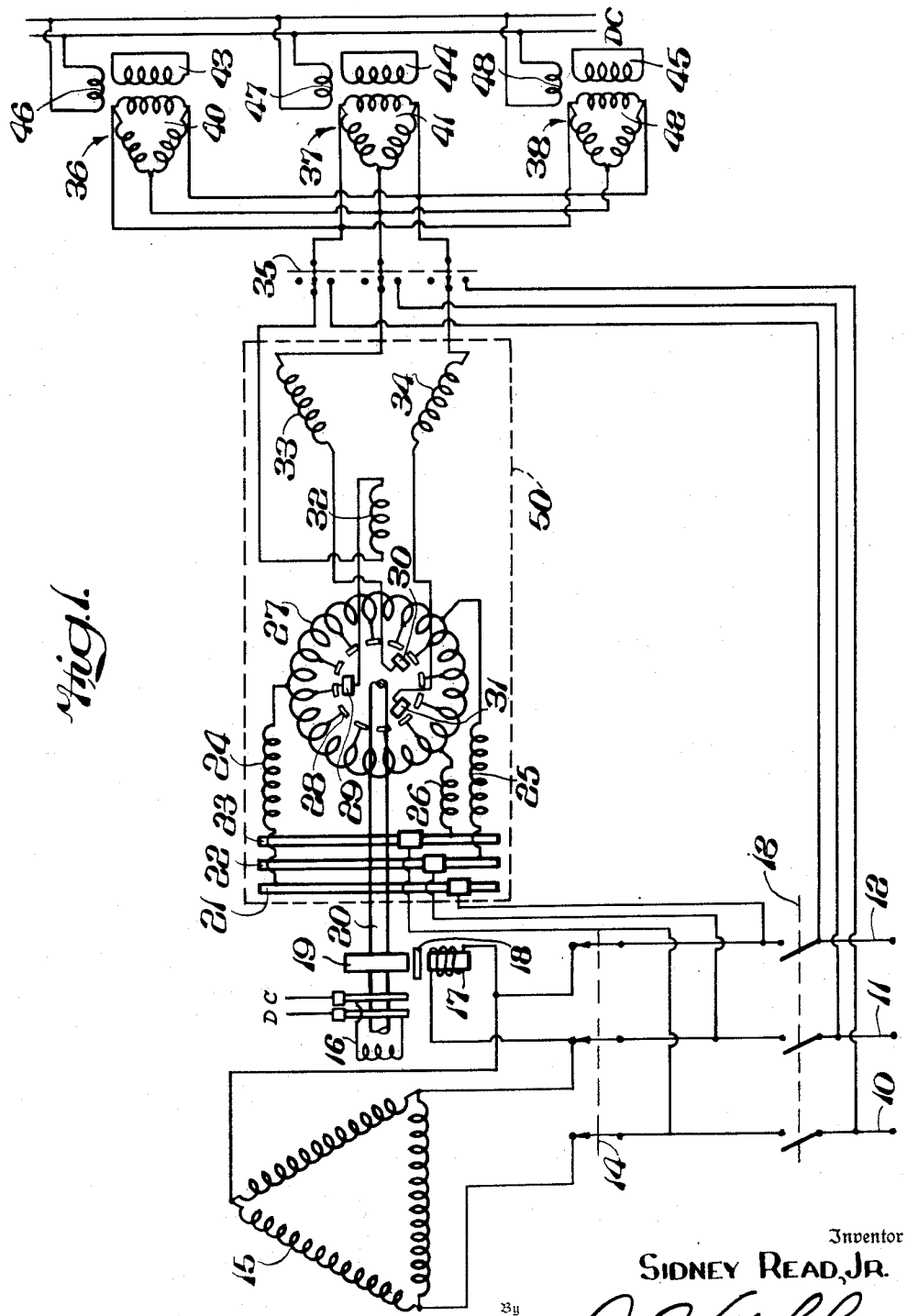

2,394,480

UNITED STATES PATENT OFFICE 2,394,480

INTERLOCKED MOTOR SYSTEM

Sidney Read, Jr., Haddonfield, N. J., assignor to Radio Corporation of America, a corporation of Delaware Application September 30, 1941, Serial No. 413,028

3 Claims. (Cl. 172—293)

This invention relates to an interlocked motor system and more particularly to an electrical motor system of the multi-phase type in which the motors may be interlocked at a standstill and brought to any desired speed while maintaining the interlocked relation between them with a minimum of oscillation and with no slippage within the power limits of the motors.

Various types of interlocking motors have heretofore been proposed and these have been more or less satisfactory for many purposes. For some purposes, however, the prior art motors have not been completely satisfactory due to the limitations on the degree of interlocking secured at various operating speeds. For example, in the well known Selsyn type of motor system both phase-wound rotors and stators are used. This arrangement gives a very satisfactory interlock at low speeds but as the speed increases the degree of interlock falls off so that at synchronous speed there is no interlock between the several motors.

In another system the several synchronous motors are driven from an alternator, the speed of which can be varied, and this arrangement has the opposite defect in operation. Although the several motors and the alternator operate in synchronism at normal running speeds when the alternator is first started, there is no voltage and therefore no interlock at low speeds and the motors may slip several poles or even several revolutions before coming into synchronism.

In still a third arrangement, a battery bank may be used and multi-phase current supplied to the motors through an appropriate commutating device. In this arrangement, the same faults arise as in the Selsyn arrangement although for a different reason. If the motors, voltages and circuit resistances are so arranged that a satisfactory interlock is secured at low speeds, then as the speed increases the motor impedance rises and the degree of interlock falls off while if the motor impedances and battery voltages are so arranged that satisfactory interlock is secured at a fairly high running speed, then resistances must be inserted in the circuit in starting and there is a tendency for the motors to slip out of phase when these resistances are switched out of or into the circuit.

In the present arrangement a special type of polyphase distributor is provided which applies a substantially uniform interlock current to the motors at all operating speeds and above a certain point the voltage applied rises with the frequency so that the current through the motor windings remains substantially constant.

One object of the invention is to provide a synchronous motor system in which the motors are interlocked at standstill and all running speeds.

Another object of the invention is to provide an interlocked motor system in which the degree of interlock does not fall off with the motor speed.

Another object of the invention is to provide an improved polyphase distributor.

Another object of the invention is to provide a motor system which may be started as an interlocked motor system which may be brought to synchronous speed interlocked and which may thereafter be operated as a synchronous motor system.

Another object of the invention is to provide a motor system using motors which may be operated either in an interlock system or which may be independently operated as synchronous motors directly from the line.

Other and incidental objects of the invention will be apparent to those skilled in the art from a reading of the following specification and an inspection of the accompanying drawings, in which Figure 1 is a schematic diagram of my improved motor system including the improved polyphase distributor, Figure 2 is a curve showing the voltage versus frequency characteristics of the improved distributor, Figure 3 is a curve showing the restoration of the type of motor used in my improved system to original angular position after being deflected a predetermined amount, Figure 4 is a curve corresponding to Figure 3 but for a motor of the prior art, and Figure 5 is a series of curves of angular displacement plotted against torque for different types of synchronous motors.

Referring to Fig. 1, power from a polyphase source which might, by way of example, be 220 volts, three-phase, 60-cycle A. C., is supplied through the leads 10, 11 and 12. The reason for reference to this particular frequency and voltage is that it is now the type most generally used for the synchronous operation of sound picture apparatus and therefore illustrates a typical commercially available power supply. It will be understood, however, that the invention is not limited as to the number of phases, voltage or frequency. This current is supplied through the switches 13 and 14 and their connecting means to the synchronous motor schematically indicated at 15, 16 which serves to drive the polyphase distributor generally indicated at 50. Power passing through the switch 13 is also supplied through appropriate leads to the collector rings 21, 22 and 23 of the polyphase distributor.

The rotor 16 of the driving motor drives the shaft 20 of the distributor which also carries a magnetic brake including the winding 17, the brake member 18 and the brake drum 19. This brake is of the type which remains applied so long as there is no current in the winding 17. Current from the collector ring is supplied through the Y-connected rotor windings 24, 25, 26 to the closed winding 27 connected to the commutator 28. Current from the commutator 28 is picked up by the brushes 29, 30 and 31 spaced 120° apart and fed through stator windings 32, 33 and 34 to the motors to be driven in synchronism through the switch 35.

If the switches 13 and 14 are closed, the switch 35 being open, the brake 18 will be released and the synchronous motor 15, 16 will bring the shaft 20 up to synchronous speed. At this speed the windings 24, 25, 26, 27 are rotating at the same rate as the electrical field and direct current will be supplied through the brushes 29, 30 and 31. In the instance above given, the windings should be so proportioned that this direct current is of the order of 20 to 30 volts for driving typical variable reluctance synchronous motors of a size of the order of ⅙ horsepower such as are used in operating sound picture apparatus.

The motors indicated at 36, 37 and 38 in Fig. 1 are of the type having Δ connected wound rotors indicated at 40, 41 and 42, D.-C. stators indicated at 46, 47 and 48 and damping windings 43, 44 and 45.

The system is not limited to the use of the particular type of motors shown, as any of the usual types of polyphase synchronous motors may be used, and it is not even necessary that all the motors of an associated group be of the same type. Whichever type of motors is used, the resistance to reactance ratio of all the motors of the group should be properly matched to the distributor characteristics.

In the operation of the system the switch 35 is left open until the polyphase distributor 50 has come up to speed. The switch 35 is then moved from the open upper position downwardly to the center or closed position shown in the drawings. Direct current is thereby supplied to the windings 40, 41 and 42 locking these rotors in position. In order to bring the motors up to the desired speed the switch 14 is opened thereby removing the driving power from the shaft 20 and applying the brake 18. Under this condition the rotor of the distributor 50 slows down at a speed determined by its own inertia, the inertia of the driven system and the effectiveness of the brake 18, and as this rotor slows down the speed of the rotors 40, 41 and 42 is increased. When the rotor 20 has come to a complete stop, alternating current is supplied through the brushes 29, 30 and 31 and the windings 32, 33 and 34 and the motors 36, 37 and 38 operate at synchronous speed, the distributor 50 serving as a transformer of proper ratio, in the present instance 1:1.

If it is desired thereafter to eliminate the distributor 50 from the circuit, the switch 35 may be moved downward to its third position thereby connecting the motors 36, 37 and 38 directly to the power source 10, 11 and 12 when they operate as synchronous motors directly from the power line, but still exactly in step.

An appropriate phase inductor or equivalent phasing device may be connected across the contacts of the switch 35 in order to determine the phase relation between the output of the polyphase distributor and the power supply line 10—11—12. The rotor of the polyphase distributor may be rotated manually or in some equivalent manner to bring its output into proper phase relation with the line if it is desired to switch these motors directly onto the line rather than to let them run off the distributor.

When it is not material whether the motors remain synchronous in stopping or not, the motors may be stopped merely by opening the power switch. If, however, it is desired to maintain the motors in their predetermined angular relation the reverse steps may be gone through, the motors being operated through the distributor 50 which remains at a standstill and the distributor 50 then being brought to synchronous speed by closing the switch 14 when the motors will be brought to a standstill and remain interlocked.

The relative characteristics of this type of motor system are shown in Figures 2 to 5. As shown in Fig. 2 a certain chosen voltage is produced at zero frequency (or D. C.) and this voltage which, as described above, with the type of one-sixth horsepower, 220-volt motors, used in sound picture recording, may be of the order of 20 to 40 volts, provides the interlock at standstill. As the distributor speed is reduced and the motor speed increases, the voltage increases slightly as rotation begins and thereafter the voltage is proportional to frequency so that a constant interlock current is maintained and this is true even if the motors are operated above synchronous speed. For example, in the operation shown in Fig. 1 the polyphase distributor may be brought to a standstill when the motors 36, 37 and 38 will be operating at synchronous speed. Any two of the leads 10, 11 and 12 may then be reversed by an appropriate switch between the switch 14 and the motor 15, 16 and the motor 15, 16 may then be started in the opposite direction to its original direction of rotation whereupon the speed of rotation of the distributor will be added to the speed of rotation of the electrical field and if the motor driving the distributor be of the synchronous type the motors 36, 37 and 38 may then be brought up to twice synchronous speed and over this entire speed range the voltage frequency characteristic illustrated in Fig. 2 will be followed.

The restoration characteristic of this motor system when deflected is shown in Fig. 3. In this figure the no load position is indicated by the lower line 51 which indicates the slight variations in speed of the motor as recorded by an oscillograph. When the motor is displaced in phase to the line 52 by loading through an angle of a little over five degrees it is immediately restored to the no load position with no oscillation whatever when the load is removed. This particular curve was taken from a standard one-sixth horsepower reluctance synchronous motor, operating at 1800 R. P. M., and driven from three-phase current at 60 cycles, this being the most desirable type of motor from the standpoint of stability.

The curve in Fig. 4 corresponds to that shown in Fig. 3, but shows the characteristics of a one-quarter horsepower Selsyn motor, operating at 1200 R. P. M. It will be noted that when this motor is deflected five mechanical degrees and then released, large oscillations about the no load position follow which gradually decrease.

In Fig. 5 the stiffness characteristic of various types of synchronous motors are shown plotted in terms of angle of mechanical deflection against the torque in ounce inches as applied to the motor shaft. The curve marked A is for a one-quarter horsepower 1200 R. P. M. Selsyn motor but with the torque and deflection referred to 1800 R. P. M. The curve marked C is for a one-sixth horsepower, 1800 R. P. M. variable reluctance synchronous motor in synchronous operation in accordance with Fig. 1.

It will be apparent to those skilled in the art that the usefulness of my improved motor system is not limited to the operation of small mechanical devices in synchronism but that it may also be used in the same manner as any of the more usual types of telemotor or telemetric devices. My system has the further advantage over ordinary synchronous motor arrangements that the driven motors need not be of the same size or type so long as their ratio of resistance to inductance is the same. For example, some of the motors may be of very high horsepower, such as would be used to control the position of a ship's rudder, or the direction of heavy ordnance while other motors actuated from the same distributor might be relatively small and light and serve to control position indicators such as rudder position indicators or gun sights. In this arrangement it will be apparent that instead of the indicating mechanism controlling the full power to be applied to the controlled device, the power control would be entirely through the distributor 50 while the indicators or signs would be actuated synchronous with the control devices and assume a position corresponding to the position of the controlled devices.

I claim as my invention:

1. The combination of alternating current supply means, distributor drive means including a shaft, a brake so energized as to brake said shaft only when said drive means is de-energized, slip rings mounted on said shaft, polyphase distributor means including a polyphase stator winding and a closed polyphase rotor winding connected through commutator brushes to said stator winding and through a polyphase rotor winding to said slip rings, and means for connecting said supply means to said drive means and to said slip rings for supplying a fixed interlock potential at the terminals of said stator winding.

2. The combination of alternating current supply means, distributor drive means including a shaft, a brake so energized as to brake said shaft only when said drive means is de-energized, slip rings mounted on said shaft, polyphase distributor means including a polyphase stator winding and a closed polyphase rotor winding connected through commutator brushes to said stator winding and through a polyphase rotor winding to said slip rings, and means for supplying at the terminals of said stator winding a variable frequency alternating current of a potential which varies directly with frequency when said supply means are connected to said slip rings and said drive means is decelerating.

3. The combination of alternating current supply means, distributor drive means including a shaft, a brake so energized as to brake said shaft only when said drive means is de-energized, slip rings mounted on said shaft, polyphase distributor means including a polyphase stator winding and a closed polyphase rotor winding connected through commutator brushes to said stator winding and through a polyphase rotor winding to said slip rings, a plurality of parallel-connected polyphase motors, and means for connecting said parallel-connected motors alternatively to said stator winding or to said supply means.

SIDNEY READ, Jr.